United States Patent
Ning

(10) Patent No.: US 7,173,774 B2
(45) Date of Patent: Feb. 6, 2007

(54) OBJECTIVE LENS

(76) Inventor: Alex Ning, 2122 Sea Island Pl., San Marcos, CA (US) 92078

( * ) Notice: Subject to any disclaimer, the term of this patent is extended or adjusted under 35 U.S.C. 154(b) by 39 days.

(21) Appl. No.: 11/080,934

(22) Filed: Mar. 14, 2005

(65) Prior Publication Data

US 2005/0162757 A1 Jul. 28, 2005

Related U.S. Application Data

(63) Continuation-in-part of application No. 10/666,640, filed on Sep. 18, 2003, now abandoned, which is a continuation-in-part of application No. 10/620,676, filed on Jul. 16, 2003, now abandoned.

(60) Provisional application No. 60/591,496, filed on Jul. 26, 2004.

(51) Int. Cl.
*G02B 13/18* (2006.01)
*G02B 9/12* (2006.01)

(52) U.S. Cl. .................................. 359/716; 359/784

(58) Field of Classification Search ......... 359/714–716
See application file for complete search history.

(56) References Cited

U.S. PATENT DOCUMENTS 6,476,982 B1  11/2002  Kawakami

| | | | |
|---|---|---|---|
| 6,728,047 B2 * | 4/2004 | Sato et al. | 359/786 |
| 6,836,382 B2 * | 12/2004 | Ning | 359/793 |
| 6,985,306 B2 * | 1/2006 | Abe | 359/716 |
| 6,985,307 B2 * | 1/2006 | Do | 359/716 |
| 6,989,947 B2 * | 1/2006 | Do | 359/791 |
| 2006/0056042 A1 * | 3/2006 | Kim et al. | 359/666 |

FOREIGN PATENT DOCUMENTS

JP          58033211          2/1983

* cited by examiner

*Primary Examiner*—Scott J. Sugarman
(74) *Attorney, Agent, or Firm*—James F. Kirk

(57) ABSTRACT

The compact imaging assembly has an electronic imager and an objective lens with a focal length fo. The objective lens receives light and forms an image of the object on the imager's image plane. The image plane has a maximum effective dimension DI. The objective lens has a first lens group comprising two to three elements with an object surface facing the object and an image surface facing an image plane. The objective lens also has a middle lens element with a concave object surface that is facing the lens group image surface, and a final lens element that has a positive power. The distance from the lens group object surface to the image plane is TT. The lens group, the middle lens and the final lens elements are coaxially aligned and on an optical axis normal to the image plane.

16 Claims, 2 Drawing Sheets

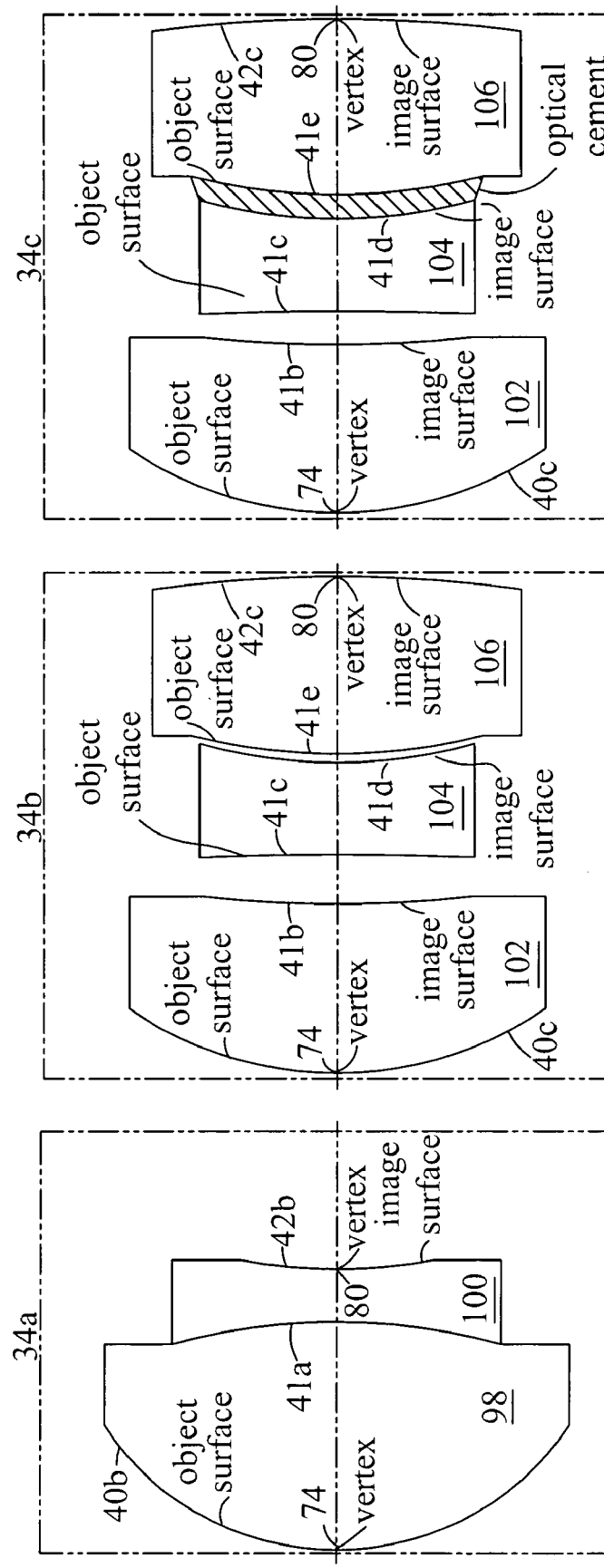

OBJECTIVE LENS

This is a Continuation-In-Part Application from earlier application Ser. No. 10/620,676 filed Jul. 16, 2003, now abandoned and from non-provisional patent application Ser. No. 10/666,640 filed Sep. 18, 2003, now abandoned and from provisional application Ser. No. 60/591,496 filed Jul. 26, 2004 all having a common inventor

FIELD OF THE INVENTION

This invention relates to compact lenses for digital camera applications and, in particular, to lenses for very compact digital cameras such as compact lenses that can be incorporated into a cellular telephones, personal digital assistants, or other very small electronic devices.

BACKGROUND OF THE INVENTION

Digital cameras utilizing high-resolution electronic imaging sensors require high resolution optics. For the consumer market, it is important that such lenses be produced in high volume and inexpensively. For use in very compact digital cameras, and cameras that might be incorporated into devices such as palm-sized computers, cellular telephones and the like, the lens must be very compact. In particular, lenses for such applications must have a very short length or height when measured from the lens front surface to the image plane. Micro-lens arrays are used on modern CCD/CMOS imagers to enhance their low light performance. A technical drawback of micro-lens array is that they limit the "field of view" to the pixels behind them. Therefore, the primary imaging lenses must be designed to be compatible with the micro-lens arrays. This requires that the off-axis rays (chief ray) exiting the image lens strike the imager image plane at a reduced angle of incidence.

It is extremely difficult to design and manufacture a lens which is both short (relative to its image circle) and telecentric. Well-known classical lens design forms include designs such as Cooke triplet, Double Gaussian lens, etc. Each of these design types fall short of meeting both of these requirements.

Aspherical lenses have some optical advantages, but cannot be easily produced by traditional glass grinding and polishing techniques. Aspheric elements are typically produced by molding plastics or low melt temperature glasses. While molded plastic elements are inexpensive to produce, the level of precision of the lenses is not always sufficient for high-resolution cameras, especially if a plastic element is used primarily as a focusing element. In addition, the optical properties of most plastic materials change with changes in temperature and humidity. The index of refraction of the plastic lens materials changes with changes in temperature, such as going in and out of doors on very hot or very cold days. This change is a significant problem with the focusing element(s), but is of much less consequence with other elements which primarily correct for aberrations. Lenses with all glass elements can overcome this problem, but tend to be large and excessively expensive for use in compact digital cameras used in other devices, such as an accessory built into a cellular phone.

In U.S. Pat. No. 6,441,971, the present applicant and inventor describes a three-element objective lens. The final lens element is shown as an aspheric plastic element. However this design has limited image quality which makes it unsuitable for high-resolution imagers. A separate infrared cut-off (IR) filter is also required. This makes this design more expensive to manufacture.

In U.S. Pat. No. 6,476,982, Kawakami claims a 4 element lens design that has a relatively short lens height (TT). The last or final element element has a negative power A negative powered element diverges rays making the chief ray striking the image plane at high angle of incidence. This makes Kawakami's design less desirable for certain imagers with micro-lens arrays.

Therefore, there is a continuing need for improved lenses that have excellent optical performance and are compact, short, light weight and inexpensive to produce while using conventional, well-proven manufacturing methods.

SUMMARY OF THE INVENTION

The above-noted problems, and others, are overcome in accordance with this invention with an objective lens for digital cameras that may also be incorporated into other devices such as a cell-phones, personal digital assistants and the like. The objective lens of this invention is extremely compact and has have a short length from the front element surface to the imaging plane, has a total of four or more lens elements and it has excellent optical characteristics.

The objective lens of the present invention comprises three optical elements with each element serving a distinct optical function. The first optical element is a lens group and it can consist of from two lens element to three lens elements. The lens group has a positive optical power. In a first embodiment, the lens group is a doublet and has two lens elements. In a second embodiment, the lens group is a triplet and has three lens elements. In a third embodiment, the lens group is also a triplet and has three lens elements, two of which are bonded together with optical cement. A middle lens element follows the lens group and is a single lens element with a meniscus shape (i.e., one side is concave and the other is convex) with the concave side facing the first lens group. This group will be identified as the middle lens element. The third lens group is also a single element with a positive power. This group will be identified as the final lens element. The primary function of the third element or final lens is to reduce the angle of incidence of off-axis rays to the image plane. The primary function of the middle lens element 36 is to reduce the off-axis optical aberrations of the lens group 34 and that of the final lens element 38 allowing the objective lens to achieve high image quality. The surface profiles of all of the lens element can be aspherical to gain further performance (i.e. surfaces that are not spherical but described by a general mathematical equation). An electronic imaging sensor 14 is spaced at a suitable distance from the final lens element.

In the preferred embodiment, an IR cut-off coating is also applied to the image surface of the final lens element to produce an integrated imaging lens with IR cut-off function. This eliminates the need for a separate IR cut-off filter in addition to the lens, thus making the entire optical assembly less costly to manufacture.

In the preferred embodiment, the lens group elements are all made of glass. The use of glass material for the lens elements reduces the sensitivity of the lens to dramatic temperature changes. A reduced temperature sensitivity provides for stabilized performance such as when a camera using the objective lens is moved from an exterior location into an interior where a substantial temperature difference exists between the two locations.

It is, therefore, an object of this invention to provide an objective lens particularly suitable for use in high resolution compact digital cameras with megapixel imagers, especially those incorporated into other compact electronic devices such as cellular phones, personal digital assistants and the like.

Another object of this invention is to provide an objective lens for digital cameras that has very low sensitivity to changes in temperature.

A further object is to provide a digital camera lens having an extremely short length from the front surface of the lens to the image plane, and having a reduced angle of incidence for the off-axis rays on the image plane.

Yet another object is to provide a digital camera lens having an integrated IR cut-off coating to provide an optimum combination of imaging quality, small F-stop, and low manufacturing cost.

BRIEF DESCRIPTION OF THE DRAWINGS

Details of the invention, and of preferred embodiments, will be further understood upon reference to the drawings, wherein:

FIG. 2a is a schematic side view of a first embodiment of the lens group within the phantom box in FIG. 1, the first embodiment of the lens group being a doublet lens element;

FIG. 2b is a schematic side view of a second embodiment of the lens group within the phantom box in FIG. 1, the second embodiment of the lens group being a triplet lens group with the middle and final element held together without a layer of optical cement between the middle element image side and the final element object side; and FIG. 2c is a schematic side view of a third embodiment of the lens group within the phantom box in FIG. 1, the third embodiment of the lens group being a triplet lens group with the middle and final element held together with a layer of optical cement between the middle element image side and the final element object side.

DETAILED DESCRIPTION OF PREFERRED EMBODIMENTS

Figure 1:
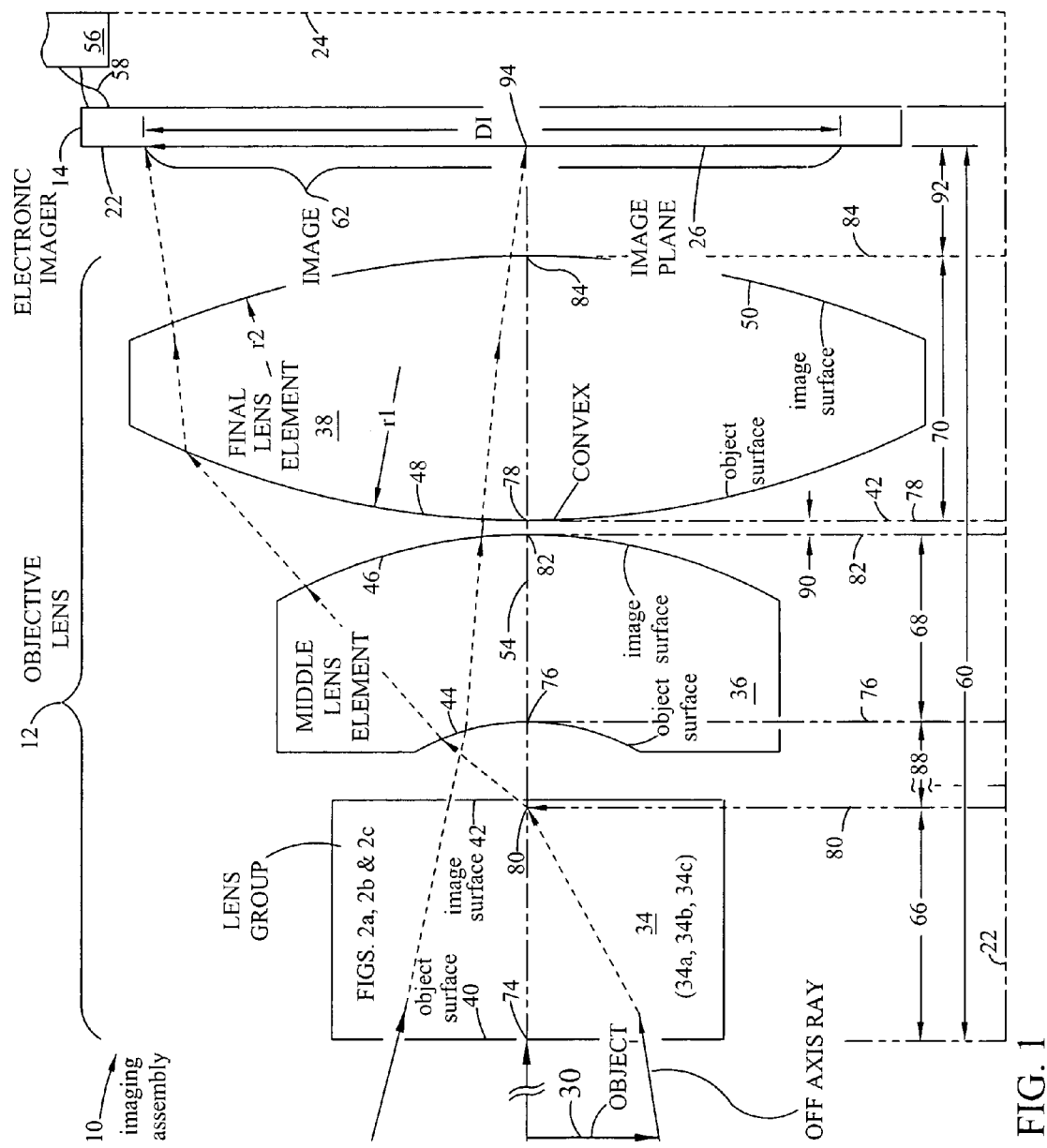
FIG. 1 is a schematic side view showing, in sequence, a lens group, a middle lens element and a final lens element aligned on the optical axis from left to right with an object on the left and an electronic imager at the right, the lens group being represented by a phantom block having an object and an image surface.

FIG. 1 shows the imaging assembly 10. The imaging assembly 10 comprises an objective lens 12 and an electronic imager 14. The objective lens12 has three optical elements that include a lens group 34, a middle lens 36 and a final lens 38. The three optical elements and the electronic imager 14 are coupled together and held in optical alignment on the optical axis from left to right by a frame represented by phantom line 22. The combination of the objective lens 12 and the electronic imager 14 on frame 22 is received by a camera body represented by phantom line 24.

The electronic imager 14 has an image plane 26 formed on an active surface The image plane 26 is typically rectangular in shape with a maximum effective dimension DI measured as the diagonal distance across the rectangular active image plane 26.

The objective lens 12 receives light rays from an object 30 in object space at the left and processes the light rays to form an image of the object (not shown) on the image plane 26. The objective lens 12 has three optical elements which include a lens group represented by block 34, a middle lens element 36 and a final lens element 38. The lens group 34 has an object surface 40 facing the object 30 and an image surface 42. The middle lens element 36 has a object surface 44 facing the lens group image surface 42 and an image surface 46. The final lens element 38 has a object surface 48 facing the middle lens element image surface 46 and an image surface 50 facing the image plane 26. The frame 22 holds each of the three lens elements and the electronic imager 14 in optical alignment on the optical axis 54. The image plane 26 is normal to the optical axis 54.

The electronic imager 14 is a purchased CCD or CMOS imager such as the Sony ICX098 CCD imager. Operation of the electronic imager 14 is supported by the control and processing electronics represented by block 56. Signal leads 58 schematically represent the cabling necessary to carry image signals, control levels and power from the electronic imager 14 to the camera electronics and processor 56.

The image plane 26 on the electronic imager 14 is the active surface that may be covered by a glass or other transparent cover (not shown) to reduce the sensitivity of the electronic imager 14 to environmental effects. Bracket 62 schematically represents the maximum diameter of an image formed on the image plane 26.

The objective lens 12 has a focal length fo. FIGS. 2a, 2b and 2c show alternative embodiments for the lens group 34. FIG. 2a shows a first embodiment comprising a doublet lens. FIG. 2b depicts a second embodiment of the lens group 34 as a non-cemented triplet lens arrangement, the lens elements being separated. FIG. 2c depicts a third embodiment of the lens group 34 as triple arrangement of lenses, the second and third lenses having a common surface, they being bonded with optical cement 105 between the two surfaces forming a doublet with lenses 104 and 106. Lens group 34 is the main focus group of the objective lens 10.

The lens group 34 in each of its three alternative embodiments has a focal length fl that is greater than zero (fl>0). The design forms for the lens group 34 embodiments include a positively powered doublet shown in FIG. 2a, a non-cemented or separated triplet shown in FIG. 2b and a three-element triplet such as that shown in FIG. 2c.

The lens group 34 is designed to obtain the ratio of fl/fo in the range of: 0.5 to 2.0. The result of positioning the ratio of fl/fo to be in the stated range provides that most of the focusing power for the objective lens 12 is satisfied by the lens group 34. The middle and final lens elements 36 and 38 shown in FIG. 1 provide aberration compensation to correct optical aberrations present in the lens group 34. The middle and final lens elements 36 and 38 also direct and focus rays passing through the center of the aperture stop to strike the image plane 26 at a reduced chief ray angle or angle of incidence.

The lens elements in lens group 34 are made from either plastic or glass depending on the application. Plastic elements in general allow for a lower manufacturing cost; however, glass elements are preferred if the operational requirements for the imaging assembly 10 is such that the objective lens 12 must have a high level of thermal stability. In an embodiment that requires high thermal stability, all of the elements in the lens group 34 are made from a glass material.

An objective lens 12 that is designed for high thermal stability avoids problems resulting from moving the lens between operational areas that have greatly differing temperatures. A typical design might require that the optical performance of the imaging assembly 10 remain substantially unchanged or that it be maintained with an imperceptible level of degradation as the imaging assembly 10 is transferred from an outdoor environment on a very hot or a very cold day to an indoor environment.

FIG. 1 shows that the middle lens element 36 in the present invention has a meniscus shape. The object surface 44 is concave and the image surface 46 is convex. The object surface 44 of this element faces the image surface 42 of the lens group 34. The optical function of the middle lens element 36 is to direct light rays exiting from the lens group image surface 42 and more particularly to provide off-axis optical aberration corrections to light rays passing from the lens group image surface 42 to the object surface 48 of the final lens element 38.

The final lens element 38 has positive optical power whereas in U.S. Pat. No. 6,476,982, Kawakami teaches a negatively powered element The positive optical power of the final lens element 38 permits it to reduce the angle of incidence of off-axis rays as they reach the image plane 26. The use of a micro-lens array also reduces the "acceptance" angle of each pixel on an image plane such as image plane 26. In order to achieve the optimal image quality, off-axis light rays exiting the lens group 34 must strike the image plane 26 with reduced angle of incidence. The use of a final lens 38 with a positive power reduces the chief ray angle which leads to improved performance of the imaging assembly.

The primary function of the final lens element 38 in the imaging assembly 10 is to satisfy this requirement. The final lens element 38 is made of glass or plastic material depending on the requirement for thermal stability. If plastic material or moldable glass material is used, it is preferable to use aspheric profiles one or both of the surfaces to gain additional aberration correction capabilities of the aspheric surfaces.

Electronic imagers today have significant spectral response above the visible range of 400–700 nm. For digital camera applications, tests have shown that best performance is obtained by limiting the spectral band-pass of the optics to a range that extends from 400 nm to about 700 nm. The spectral band is limited by the use of an interference coating referred to as an IR cut-off coating. The IR cut-off coating is typically formed on the surface of a lens by the deposition or application of multiple layers of optical material, each layer having its own specific index of refraction and its own thickness. The filter is structured to transmit light within its spectral band and to reflect light outside the spectral band. The design theory and practice of IR coatings of this type is well understood in the art and is available in texts such as "Thin-Film Optical Filters" by H. A. Macleod. The third edition of the text with 672 pages was published in June 2000 by the Institute of Physics Publishing and is identified by its ISBN: 0750306882.

Applying the coating directly to image surface 50 on the final lens 38 provides a more compact lens design and reduces the cost of the whole product by the elimination of a separate component, such as a coated plate. A cost saving advantage of the present invention is that the IR coating can be applied directly to the substantially flat final lens element image surface 50. The material of the final lens element 38 and the substantially flat shape of the final lens element image surface 50 is compatible with the preferred IR cut-off filter coating process. If the surface to be coated is not substantially flat, an applied coating tends to not be uniform in thickness. The result is that the filter properties of regions across the surface of the coated lens surface are not uniform. In addition, the use of glass as a material for the final lens element 38 eliminates the possibility of image distortion that is encountered when high temperatures are used to apply coatings to plastic lenses. If the material to be used is plastic, and if the temperature is high enough, the lens can deform or warp or even melt during the coating process.

If the middle lens element 36 and or the final lens element 38 are to have an aspherical surface, and if cost is to be reduced, the lens group 34, the middle lens element 36 and the final lens element 38 respectively, should be made from plastic using a manufacturing technique that is suitable for producing aspheric surfaces. If the material selected for these lens elements is plastic, precision molding is used to insure precision and product quality. If glass is to be used, a glass molding process is used to make the lens elements. As explained above, the middle lens element 36 and the final lens element 38 provide most of the aberration correction of the objective. It is therefore reasonable to believe that the use of plastic material for the middle lens element 36 and the final lens element 38 will have a minimal influence on the focus stability of the imaging assembly 10 even though the plastic material to be used would be more sensitive to temperature and other environmental conditions than glass.

Referring to FIG. 1, objective lens 12 has a height TT shown as dimension 60. The height or length of the objective TT is shown to be equal to the sum of the thickness of the lens group 34, the middle lens element 36 and final lens element 38 plus the distance between the lens elements and the distance to the image plane. The height is therefore the sum of the distances characterized as dimensions 66, 68, and 70 plus the separation distances 88, 90 and 92. Each of the respective lens thicknesses are measured as the distance between the first and second vertex of each respective lens. The three thicknesses are then added to the separation distance 88 between the lens group second vertex 80 and the middle lens element first vertex 76. The resulting sum is then added to separation distance 90; the distance between the middle lens element second vertex 82 and the final lens element first vertex 78. The resulting sum is then added to the image plane distance 92, the separation between the final lens element second vertex 84 and center of the image plane 94.

The frame 22 aligns and couples the objective lens 12 with the electronic imager 14 to form the imaging assembly 10. The imaging assembly 10 is then connected to the camera electronics and processor 56 via signal leads 58. The imaging assembly 10 is then assembled into the camera body 24 for use in a digital camera (not shown).

The height TT (dimension 60) of the objective lens 12 of the present invention is very short relative to the size of the image, DI, that it provides. An electronic camera using an objective lens such as the objective lens 10 forms an image represented by bracket 62 on the image plane 26 on the electronic imager 14. Bracket 62 on the image plane 26 schematically identifies the limits of the image formed on the image plane. The effective imaging area of the electronic imager 14 is typically rectangular in shape with a diagonal size equal to dimension DI. The objective lens 12 forms a circular image on the image plane 26 with a diameter equal or greater than DI to provide a complete rectangular image and to achieve acceptable image quality.

As explained above, the lens height or total track (TT) is shown as dimension 60 along frame 22 at the base of FIG. 1. The height or total track is defined as the distance from the lens group object surface vertex 74 to the image plane 26. The COMPACTNESS of the optical imager 10 is defined by the ratio of TT to DI. As this ratio is reduced, the resulting lens is shorter and more appealing for use in hand held appliances. For prior art lens designs, this ratio is believed to be greater than 1.5. However, the objective lens 12 of the present invention obtains an improvement in this ratio such that the ratio of TT/DI<1.5. With the ratio of TT/DI<1.5, the optical imager assembly 44, which includes the imaging assembly 10, is considered to be a low profile optical imager which makes it suitable for compact digital camera modules such as those used in cell phones. The use of the imaging assembly 10 of the present invention of FIGS. 1 and FIGS. 2a through FIG. 2c in combination with a suitable selection of optical material and by forming the elements to comply with the prescriptions of Tables 1 and 2 achieves an objective lens assembly 10 with excellent image quality and with a ratio of TT/DI<1.5. An alternate measure of the compactness of a lens is the ratio of TT/fo where fo is the focal length of the entire objective lens. The focal length fo is closely related to DI for a given field of view requirement. In terms of TT/fo, the present invention achieve a TT/fo<1.7.

The term "STANDARD" is used to indicate a spherical surface, and "EVENASPH " is used herein to indicate an "aspheric" type surface characterized by an even ordered polynomial such as Equation 1 below. Such terms are conventional in the field of lens design. The terms "STANDARD" and EVENASPH as used in this specification and in the claims are to be interpreted in accordance with their conventional meanings and in support of a lens surface equation such as Equation 1 below. The legend EVENSPH that appears in Tables 1 with a column heading "TYPE" requires that the surface be first formed in accordance with the requirements of the surface description of Table 1 and then further characterized by an even ordered polynomial such as Equation 1 below. The legend STANDARD implies that the surface is spherical in character and is not followed by an aspherical surface correction.

Equation 1 provides the sag or surface displacement "z" measured from a plane passing through a surface vertex of the lens, the plane being normal to the optical axis.

$$z = \frac{cy^2}{1 + [1 - (1+k)c^2y^2]^{1/2}} + Dy^4 + Ey^6 + Fy^8 + Gy^{10} + Hy^{12} + Iy^{14} \quad \text{Eq. 1}$$

The distance "z" is measured at a distance or radius "y" from the optical axis 54 of the objective lens 12. The coefficient "c" is the curvature of the lens at the optical axis and it is equal to the reciprocal of the radius. The coefficient "k" is a conic constant. A surface is spherical if "k" and "D" through "I" are all zero. A surface is an aspherical surface if either "k" or any of the coefficients "D" through "I" are non-zero.

Table 2 has a first and second set of six rows each. The first or top set provides the D, E, F and G coefficients for a prescription in accordance with Equation 1 for the middle lens element object surface 44. The second or lower set provides the D, E, F and G coefficients for a prescription in accordance with Equation 1 for the middle lens element image surface 46.

First Lens Group Having a Doublet Combination, FIG. 2a

A first preferred embodiment of the present invention is obtained using the prescriptions of Table 1 and Table 2. The doublet lens within phantom box 34a in FIG. 2a is substituted for the lens group 34 in FIG. 1 and a prescription for its surfaces is provided in rows 1, 2, 3 and 4 of Table 1. The lens group object surface (40b) collects rays of light from an object such as the object 30 in FIG. 1. FIG. 2a shows the doublet formed from first lens elements 98 and second lens element 100. The three lens surfaces are characterized as STANDARD, therefore, each of the three surfaces are spherical surfaces.

Row 2 of Table 1 shows that the radius of surface 40b is 1.715843 mm and the thickness of lens element 98 is 1.423295 mm. The index and Abbe number of the material is shown in the table.

Row 3 of Table 1 shows that the radius of surface 41a is −3.767583. The thickness of lens element 100 is 0.32525 mm. The index and Abbe number of the material is shown in the table.

Row 4 of Table 1 shows that the radius of surface 42b is 3.227809 mm. The dimension distance between vertex 80 the stop is 0.54069 mm Row 5 provides a prescription for the middle lens element object surface 44. The radius is −2.8859 mm. The thickness is 1.217885 mm The index and Abbe number of the material is shown in the table.

Row 6 provides a prescription for the middle lens element image surface 46. The radius is 7.761245 mm. The distance 90 is measured between the vertex 82 and 78 and is equal to 0.1 mm.

Row 7 provides a prescription for the final lens element object surface 48. The radius is +7.818255 mm so the lens is convex. The lens thickness is given as 1.392907 mm. The index and Abbe number of the material are as shown in the table.

Row 8 provides the radius of the final lens element image surface 50 as 7.818260 mm. The distance to the image plane 26 is 0.999993 mm. Row 9 shows that the image plane has a spherical surface with an infinite radius which is the characterization for a flat surface.

TABLE 1

SURFACE DATA SUMMARY (doublet 34b, FIG. 2a)

| Row | Surface | Type | Radius | Thickness | Index | Abbe |
|---|---|---|---|---|---|---|
| 1 | OBJ 30 | STANDARD | Infinity | Infinity | | |
| 2 | 40b | STANDARD | 1.715843 | 1.423295 | 1.641 | 60.1 |
| 3 | 41a | STANDARD | −3.767582 | 0.325250 | 1.673 | 32.2 |
| 4 | 42b | STANDARD | 3.227809 | 0.540690 | | |
| 5 | 44 | EVENASPH | −2.885900 | 1.217885 | 1.491 | 57.4 |
| 6 | 46 | EVENASPH | −7.761245 | 0.100000 | | |
| 7 | 48 | STANDARD | 7.818255 | 1.392907 | 1.855 | 36.6 |
| 8 | 50 | STANDARD | −7.818260 | 0.999993 | | |
| 9 | IMA | STANDARD | Infinity | | | |

Table 2 has a first and second set of six rows each. Table 2 is used in connection with Table 1 to characterize the middle lens element surfaces 44 and 46 for the second embodiment using the doublet of FIG. 2b. The first or top set provides the D, E, F and G coefficients for a prescription in accordance with Equation 1 for middle lens element object surface 44. The second or lower set provides the D, E, F and G coefficients for a prescription in accordance with Equation 1 for the middle lens element image surface 46. Coefficients are not provided by rows 5 and 6 for coefficients H and I. These coefficients would be initialized to be zero.

TABLE 2

Aspheric coefficients for surfaces of the middle lens element 36

| Row | Surface 44 of the middle lens element 36, an EVENASPH Lens Surface | |
|---|---|---|
| 1 | D | −0.15545497 |
| 2 | E | −0.1693017 |
| 3 | F | 0.58931065 |
| 4 | G | −1.0012036 |
| 5 | H | |
| 6 | I | |

TABLE 2-continued

Aspheric coefficients for surfaces of the middle lens element 36

| Row | | Surface 44 of the middle lens element 36, an EVENASPH Lens Surface |
|---|---|---|
| 1 | D | −0.026801269 |
| 2 | E | 0.000946834 |
| 3 | F | −0.000221566 |
| 4 | G | −7.01E−05 |
| 5 | H | |
| 6 | I | |

Row 6 provides a prescription for the final lens element object surface 48. The radius is +3.263752 mm. The lens thickness is given as 1.0 mm. The index and Abbe number of the material are as shown in the table.

Row 7 provides the radius of the final lens element image surface 50 as 3.807911 mm so the lens surface is convex. The distance to the image plane 26 is 2.125013 mm. Row 9 shows that the image plane has a spherical surface with an infinite radius which is the characterization for a flat surface.

TABLE 3

Fo = 4.7 mm
Fl = 6.2 mm
Fo/Fl = 1.3
Focal length of Last element = 26.15 mm (positive)
TT/Fo = 1.4
TT/DI = 1.2
SURFACE DATA SUMMARY (FIG. 3)

| Row | Surface Number | Type | Radius | Thickness | Index | Abbe No. |
|---|---|---|---|---|---|---|
| | Object | Standard | Infinity | Infinity | | |
| 1 | 40b | Standard | 3.298402 | 1.437373 | 1.855442 | 36.585445 |
| 2 | 41d/e | Standard | −2..856453 | 0.4 | 1.846663 | 23.825580 |
| 3 | 42b | Standard | 6.326696 | 0.7099177 | | |
| 4 | 44 | Evenasph | −1.679158 | 0.8 | 1.531160 | 56.043828 |
| 5 | 46 | Evenasph | −1.645513 | 0.05734437 | | |
| 6 | 48 | Evenasph | 3.263752 | 1 | 1.531160 | 56.043828 |
| 7 | 50 | Evenasph | 3.807011 | 2.125013 | | |
| 8 | Image Plane | Infinity | | | | |

TABLE 4

SURFACE DATA DETAIL:

| SURFACE | OBJECT | STANDARD |
|---|---|---|
| SURFACE | 1 | STANDARD |
| SURFACE | 2 | STANDARD |
| SURFACE | 3 | STANDARD |

| SURFACE | 4 | EVENASPH |
|---|---|---|
| Row Number | Coefficient From Equation 1 | Surface 44 of the middle lens element 36, an EVENASPH Lens Surface |
| 1 | C | 0 |
| 2 | D | 0.069226113 |
| 3 | E | −0.085901865 |
| 4 | F | 0.091442025 |
| 5 | G | −0.023422377 |

TABLE 4-continued

SURFACE DATA DETAIL:

| 6 | H | 0 |
|---|---|---|
| 7 | I | 0 |

| SURFACE | 5 | EVENASPH |
|---|---|---|
| Row Number | Coefficient From Equation 1 | Surface 46 of the middle lens element 36, an EVENASPH Lens Surface |
| 1 | C | 0 |
| 2 | D | 0.036835452 |
| 3 | E | −0.010283807 |
| 4 | F | 0.01352677 |
| 5 | G | 0.00055405548 |
| 6 | H | 0 |
| 7 | I | 0 |

TABLE 5

SURFACE DATA DETAIL:

| SURFACE | 6 | EVENASPH |
|---|---|---|
| Row Number | Coefficient From Equation 1 | Surface 48 of the middle lens element 38, an EVENASPH Lens Surface |
| 1 | C | 0 |
| 2 | D | −0.043297094 |
| 3 | E | 0.0075395307 |
| 4 | F | −0.0012147876 |
| 5 | G | 6.3786473e−005 |
| 6 | H | 0 |
| 7 | I | 0 |

| Surface | 7 | EVENASPH |
|---|---|---|
| Row Number | Coefficient From Equation 1 | Surface 50 of the middle lens element 38, an EVENASPH Lens Surface |
| 1 | C | 0 |
| 2 | D | −0.039461086 |
| 3 | E | 0.0034338701 |

TABLE 5-continued

SURFACE DATA DETAIL:

| | | |
|---|---|---|
| 4 | F | −0.00035906711 |
| 5 | | −6.1990478e−006 |
| 6 | | 0 |
| 7 | | 0 |

| Surface | IMAGE | STANDARD |
|---|---|---|

First Lens Group with Three Separate Lens Elements, FIG. 2b

Table 3 provides a second preferred embodiment of the present invention. The surfaces are all STANDARD. There are no aspheric surfaces. The triplet lens within phantom box 34b is formed with three separate lenses as shown in FIG. 2b. When formed, the lens group is substituted for the lens group 34 in FIG. 1. A prescription for its surfaces is provided in rows 1, 2, 3, 4, 5, 6 and 7 of Table 3. As in the case of the first embodiment, the lens group object surface (40c) collects rays of light from the object 30 shown schematically in FIG. 1. FIG. 2b shows the triplet formed from first lens elements 102, second lens element 104 and third lens element 106. The three lens surfaces are characterized as STANDARD, therefore, each of the three surfaces are spherical surfaces.

Row 2 of Table 3 shows that the radius of surface 40c is 2.25801 mm and the thickness of lens element 102 is 1.058656 mm.

Row 3 of Table 3 shows that the radius of surface 41b is 7.551701. The distance to the vertex on object surface 41c of lens element 104 is 0.1086743 mm and the index of refraction is 1.673048.

Row 4 of Table 3 shows that the radius of surface 41c is −22.14754 mm and the thickness of lens 104 is 0.5789873 mm.

Row 5 of Table 3 shows that the radius of surface 41d is 3.11468 mm and the distance between the vertex on surface 41d of lens 104 and surface 41e of lens 106 is 0.05402182 mm.

Row 6 of Table 3 shows that the radius of surface 41e is 3.603306 mm and the thickness of lens 106 is 1.100749 mm.

Row 7 of Table 3 shows that the radius of surface 42c is −8.174966 mm and the distance between the vertex on surface 42c and the object surface 44 of lens 36 in FIG. 1 is 0.7061964 mm.

Row 8 of Table 3 shows that the radius of surface 44 is −1.275432 mm. The thickness or dimension 68 of the middle lens element 36 between vertex 76 and 82 is 1.004195 mm.

Row 9 of Table 3 shows that the image surface 46 has a radius of −2.559828 mm. The thickness column provides the dimension 90 from the middle lens element vertex 82 to the final lens element object surface vertex 78. The dimension 90 is 0.485716 mm.

Row 10 of Table 3 shows that the radius of surface 48 is 9.962559 mm. The thickness or dimension 70 of the final lens element 38 between vertex 78 and 84 is 1.358772 mm Row 11 of Table 3 shows that the image surface 50 has a radius of −40.95514 mm. The thickness column provides the dimension 92 distance from the final lens element vertex 84 to the center of the image plane 94 as being 0.984538 mm. The aperture diameter is 6.151768 mm.

Row 12 of Table 3 characterizes the image plane 26 as IMA. The IMA has a radius that is infinity, therefore the image plane is flat.

TABLE 3

Focal length fo = 5.45 mm  
F-number = 2.8  
Total track = 7.0 mm  
Image circle = 6.6 mm  
TT/fo = 1.284  
TT/DI = 1.06

SURFACE DATA SUMMARY (triplet 34b, FIG. 2b)

| Row | Surface Number | Type | Radius | Thickness | Index | Abbe |
|---|---|---|---|---|---|---|
| 1 | OBJ | STANDARD | Infinity | Infinity | | |
| 2 | 40c | STANDARD | 2.25801 | 1.058656 | 1.803 | 46.7 |
| 3 | 41b | STANDARD | 7.551701 | 0.1086743 | | |
| 4 | 41c | STANDARD | −22.14754 | 0.5789873 | 1.785 | 25.8 |
| 5 | 41d | STANDARD | 3.114468 | 0.05402182 | | |
| 6 | 41e | STANDARD | 3.603306 | 1.100749 | 1.803 | 46.7 |
| 7 | 42c | STANDARD | −8.174966 | 0.7061964 | | |
| 8 | 44 | STANDARD | −1.275432 | 1.004195 | 1.847 | 23.8 |
| 9 | 46 | STANDARD | −2.559828 | 0.0485716 | | |
| 10 | 48 | STANDARD | 9.962559 | 1.358772 | 1.836 | 42.3 |
| 11 | 50 | STANDARD | −40.95514 | 0.984538 | | |
| 12 | IMA | STANDARD | Infinity | | | |

First Lens Group Triplet with a Cemented Doublet Combination

Tables 4 and 5 provide a third preferred embodiment of the present invention using a triplet with the cemented doublet combination such as that shown in FIG. 2c substituted for the first lens group in block 34 of FIG. 1. Table 7 shows that the middle lens 36 is EVENASPH The triplet lens within phantom box 34b is formed with a single lens 102 and a doublet lens formed by lenses 104 and 106. When formed, the lens group is substituted for the lens group 34 in FIG. 1. A prescription for the lens surfaces of the third embodiment is provided in rows 1, 2, 3, 4, 5, 6 and 7 of Table 4. As in the case of the first embodiment, the lens group object surface (40c) collects rays of light from the object 30 shown schematically in FIG. 1. FIG. 2c shows the triplet formed from first lens elements 102, second lens element 104 and third lens element 106. The three lens surfaces are characterized as STANDARD, therefore, each of the three surfaces are spherical surfaces.

Row 2 of Table 4 shows that the radius of surface 40c is 2.231872 mm and the thickness of lens element 102 is 1.120786 mm.

Row 3 of Table 4 shows that the radius of surface 41b is 4.345951 mm. The distance to the vertex on object surface 41c of lens element 104 is 0.2630375 mm and the index of refraction is 1.803. The Abbe number is 46.8.

Row 4 of Table 4 shows that the radius of surface 41c is −14.90464 mm and the thickness of lens 104 is 0.4792389 mm.

Row 5 of Table 4 shows that the radius of surface 41d/e is 2.2 mm and the thickness of lens 106 is 0.9680706 mm. The surfaces 41d and 41e have identical radii.

Row 6 of Table 4 shows that the radius of surface 42c is −6.483506 mm and the distance from vertex 80 to vertex 76 is 0.7311299 mm.

Row 7 of Table 4 shows that the radius of surface 44 is 1.190766 mm. The thickness or dimension 68 of the middle lens element 36 between vertex 76 and 82 is 0.7931577 mm.

Row 8 of Table 4 shows that the image surface 46 has a radius of 3.255035 mm. The thickness column provides the dimension 90 from the middle lens element vertex 82 to the final lens element object surface vertex 78. The dimension 90 is 0.08913065 mm.

Row 9 of Table 4 shows that the radius of surface 48 is 11.64557 mm. The thickness or dimension 70 of the final lens element 38 between vertex 78 and 84 is 1.406402 mm Row 10 of Table 4 shows that the image surface 50 has a radius of −11.64557 mm. The thickness column provides the dimension 92 distance from the final lens element vertex 84 to the center of the image plane 94 as being 1.170561 mm. The aperture diameter is 6.151768 mm.

Row 12 of Table 4 characterizes the image plane 26 as IMA. The IMA has a radius that is infinity, therefore the image plane is flat.

Table 4 provides a Summary of Surface Data for the embodiment of FIG. 2c in combination with lenses 36 and 38 of FIG. 1.

TABLE 7

Focal length fo = 5.65 mm
F-number = 2.8
Total track = 7.0 mm
Image circle = 6.4 mm
TT/fo = 1.2389
TT/DI = 1.09
SURFACE DATA SUMMARY (triplet 34c, FIG. 2c)

| Row | Surface Number | Type | Radius | Thickness | Index | Abbe |
|---|---|---|---|---|---|---|
| 1 | OBJ | STANDARD | Infinity | Infinity | | |
| 2 | 40c | STANDARD | 2.231872 | 1.120786 | 1.803 | 46.8 |
| 3 | 41b | STANDARD | 4.345951 | 0.2630375 | | |
| 4 | 41c | STANDARD | −14.90464 | 0.4792389 | 1.785 | 25.8 |
| 5 | 41d/e | STANDARD | 2.2 | 0.9680706 | 1.803 | 46.8 |
| 6 | 42c | STANDARD | −6.483506 | 0.7311299 | | |
| 7 | 44 | EVENASPH | −1.190766 | 0.7931577 | 1.530 | 55.9 |
| 8 | 46 | EVENASPH | −3.255035 | 0.08913065 | | |
| 9 | 48 | STANDARD | 11.64557 | 1.406402 | 1.836 | 42.3 |
| 10 | 50 | STANDARD | −11.64557 | 1.170561 | | |
| 12 | IMA | STANDARD | Infinity | | | |

Table 5: Aspheric coefficients for surface 44 and 46 in Table 4 for the lens group configuration of FIG. 2c using a single lens plus a cemented doublet.

TABLE 5

SURFACE DATA DETAIL Aspheric coefficients for surface 44 and 46 in Table 4.

| SURFACE Row Number | 44 Coefficient From Equation 1 | EVENASPH Surface 44 of the middle lens element 36, an EVENASPH Lens Surface |
|---|---|---|
| 1 | C | 0 |
| 2 | D | 0.0059721186 |
| 3 | E | 0.048396768 |
| 4 | F | −0.02009245 |
| 5 | G | 0 |
| 6 | H | 0 |
| 7 | I | 0 |

| SURFACE Row Number | 46 Coefficient From Equation 1 | EVENASPH Surface 46 of the middle lens element 36, an EVENASPH Lens Surface |
|---|---|---|
| 1 | C | 0 |
| 2 | D | 0.013788566 |
| 3 | E | −0.0021099459 |
| 4 | F | −0.00036758737 |
| 5 | G | 0 |

TABLE 5-continued

SURFACE DATA DETAIL Aspheric coefficients for surface 44 and 46 in Table 4.

| 6 | H | 0 |
|---|---|---|
| 7 | I | 0 |

While certain specific relationships, materials and other parameters have been detailed in the above description of preferred embodiments, those can be varied, where suitable, with similar results. Other applications and variations of the present invention will occur to those skilled in the art upon reading the present disclosure. Those variations are also intended to be included within the scope of this invention as defined in the appended claims.

I claim:

1. An objective lens for receiving light from an object and for forming an image of the object on the image plane, the objective lens consisting of:
    a first lens group having a cemented doublet element having a positive power,
    a middle lens element having an object surface and an image surface, the object surface being a concave surface facing the first lens group, the image surface being a convex surface facing the image plane, and
    a final lens element having a positive power, a convex spherical surface facing the image plane and a spherical surface facing object space, and wherein said objective lens satisfies the condition of TT/fo=<1.7; wherein fo designates the focal length of the entire objective lens assembly; and TT designates the distance between the most object side surface of the first lens group to the image plane.

2. The objective lens of claim 1 wherein the lens elements in the lens group are made of glass materials.

3. The objective lens of claim 1 wherein at least one surface of the middle lens element is aspherical.

4. The objective lens of claim 1 wherein the spherical surface facing object space is a convex spherical surface.

5. The objective lens of claim 1 wherein the final lens element image surface is coated with an IR cut-off interference coating.

6. The objective lens of claim 1 wherein the lens group has two elements, the middle lens element having an aspherical surface and the final lens elements being shaped to conform to the prescription of the following Table 1 and Table 2 as follows:

TABLE 1

SURFACE DATA SUMMARY (doublet 34b)

| Row | Surface | Type | Radius | Thickness | Index | Abbe |
|---|---|---|---|---|---|---|
| 1 | OBJ 30 | STANDARD | Infinity | Infinity | | |
| 2 | 40b | STANDARD | 1.715843 | 1.423295 | 1.641 | 60.1 |
| 3 | 41a | STANDARD | −3.767582 | 0.325250 | 1.673 | 32.2 |
| 4 | 42b | STANDARD | 3.227809 | 0.540690 | | |
| 5 | 44 | EVENASPH | −2.885900 | 1.217885 | 1.491 | 57.4 |
| 6 | 46 | EVENASPH | −7.761245 | 0.100000 | | |
| 7 | 48 | STANDARD | 7.818255 | 1.392907 | 1.855 | 36.6 |
| 8 | 50 | STANDARD | −7.818260 | 0.999993 | | |
| 9 | IMA | STANDARD | Infinity | | | |

TABLE 2

Aspheric coefficients for surfaces of the middle lens element 36

| Row | Surface 44 of the middle lens element Evenasph Lens | |
|---|---|---|
| 1 | D | −0.15545497 |
| 2 | E | −0.1693017 |
| 3 | F | 0.58931065 |
| 4 | G | −1.0012036 |
| 5 | H | |
| 6 | I | |
| | Surface 46 of the middle lens element Evenasph Lens | |
| 1 | D | −0.026801269 |
| 2 | E | 0.000946834 |
| 3 | F | −0.000221566 |
| 4 | G | −7.01E-05 |
| 5 | H | |
| 6 | I. | |

7. The objective lens of claim 1 wherein the first lens group is a cemented doublet and the middle lens element and the final lens element are shaped to conform to the prescription of the following Table 3, 4 and 5 as follows:

TABLE 3

SURFACE DATA SUMMARY (FIG. 3)

| Row | Surface Number | Type | Radius | Thickness | Index | Abbe No. |
|---|---|---|---|---|---|---|
| | Object | Standard | Infinity | Infinity | | |
| 1 | 40b | Standard | 3.298402 | 1.437373 | 1.855442 | 36.585445 |
| 2 | 41d/e | Standard | −2..856453 | 0.4 | 1.846663 | 23.825580 |
| 3 | 42b | Standard | 6.326696 | 0.7099177 | | |
| 4 | 44 | Evenasph | −1.679158 | 0.8 | 1.531160 | 56.043828 |
| 5 | 46 | Evenasph | −1.645513 | 0.05734437 | | |
| 6 | 48 | Evenasph | 3.263752 | 1 | 1.531160 | 56.043828 |
| 7 | 50 | Evenasph | 3.807011 | 2.125013 | | |
| 8 | Image Plane | Infinity | | | | |

TABLE 4

SURFACE DATA DETAIL:

| Row Number | Coefficient From Equation 1 | Surface 44 of the middle lens element 36, an EVENASPH Lens Surface |
|---|---|---|
| 1 | C | 0 |
| 2 | D | 0.069226113 |
| 3 | E | −0.085901865 |
| 4 | F | 0.091442025 |
| 5 | G | −0.023422377 |
| 6 | H | 0 |
| 7 | I | 0 |
| SURFACE Row Number | 5 Coefficient From Equation 1 | EVENASPH Surface 46 of the middle lens element 36, an EVENASPH Lens Surface |
| 1 | C | 0 |
| 2 | D | 0.036835452 |
| 3 | E | −0.010283807 |
| 4 | F | 0.01352677 |
| 5 | G | 0.00055405548 |
| 6 | H | 0 |
| 7 | I | 0 |

TABLE 5

SURFACE DATA DETAIL:

| SURFACE Row Number | 6 Coefficient From Equation 1 | EVENASPH Surface 48 of the middle lens element 38, an EVENASPH Lens Surface |
|---|---|---|
| 1 | C | 0 |
| 2 | D | −0.043297094 |
| 3 | E | 0.0075395307 |
| 4 | F | −0.0012147876 |
| 5 | G | 6.3786473e-005 |
| 6 | H | 0 |
| 7 | I | 0 |
| Surface Row Number | 7 Coefficient From Equation 1 | EVENASPH Surface 50 of the middle lens element 38, an EVENASPH Lens Surface |
| 1 | C | 0 |
| 2 | D | −0.039461086 |
| 3 | E | 0.0034338701 |
| 4 | F | −0.00035906711 |
| 5 | | −6.1990478e-006 |

TABLE 5-continued

SURFACE DATA DETAIL:

| 6 | 0 |
|---|---|
| 7 | 0 |
| Surface | IMAGE STANDARD. |

8. An objective lens for receiving light from an object and for forming an image of the object on the image plane, the objective lens consisting of:
a first lens group having a positive power and three lens elements within the first lens group:
a middle lens element having an object surface and an image surface, the object surface being a concave surface facing the first lens group, the image surface being a convex surface facing the image plane, and
a final lens element having a positive power; and wherein said objective lens satisfies the condition of TT/fo=<1.7; wherein fo designates the focal length of the entire objective lens assembly; and TT designates the distance between the most object side surface of the first lens group to the image plane.

9. The objective lens of claim 8 wherein the first lens group second and the third elements are cemented forming a doublet element.

10. The objective lens of claim 8 wherein the lens elements in the lens group are made of glass materials.

11. The objective lens of claim 8 wherein at least one surface of the middle lens element is aspherical.

12. The objective lens of claim 8 wherein the final lens element is made of glass material.

13. The objective lens of claim 8 wherein the final lens element image surface is coated with an IR cut-off interference coating.

14. The objective lens of claim 8 wherein the lens group elements are separated, the middle lens element and the final lens element are shaped to conform to the prescription of the following Table 3 as follows:

TABLE 3

SURFACE DATA SUMMARY (triplet 34c)

| Row | Surface Number | Type | Radius | Thickness | Index | Abbe |
|---|---|---|---|---|---|---|
| 1 | OBJ | STANDARD | Infinity | Infinity | | |
| 2 | 40c | STANDARD | 2.25801 | 1.058656 | 1.803 | 46.7 |
| 3 | 41b | STANDARD | 7.551701 | 0.1086743 | | |
| 4 | 41c | STANDARD | −22.14754 | 0.5789873 | 1.785 | 25.8 |
| 5 | 41d | STANDARD | 3.114468 | 0.05402182 | | |
| 6 | 41e | STANDARD | 3.603306 | 1.100749 | 1.803 | 46.7 |
| 7 | 42c | STANDARD | −8.174966 | 0.7061964 | | |
| 8 | 44 | STANDARD | −1.275432 | 1.004195 | 1.847 | 23.8 |
| 9 | 46 | STANDARD | −2.559828 | 0.0485716 | | |
| 10 | 48 | STANDARD | 9.962559 | 1.358772 | 1.836 | 42.3 |
| 11 | 50 | STANDARD | −40.95514 | 0.984538 | | |
| 12 | IMA | STANDARD | Infinity. | | | |

15. The objective lens of claim 8 wherein the first lens group second and third lens elements are cemented together and the middle lens element and the final lens element are shaped to conform to the prescription of the following Table 4 and 5 as follows:

TABLE 4

SURFACE DATA SUMMARY (triplet 34c, FIG. 2c)

| Row | Surface Number | Type | Radius | Thickness | Index | Abbe |
|---|---|---|---|---|---|---|
| 1 | OBJ | STANDARD | Infinity | Infinity | | |
| 2 | 40c | STANDARD | 2.231872 | 1.120786 | 1.803 | 46.8 |
| 3 | 41b | STANDARD | 4.345951 | 0.2630375 | | |
| 4 | 41c | STANDARD | −14.90464 | 0.4792389 | 1.785 | 25.8 |
| 5 | 41d/e | STANDARD | 2.2 | 0.9680706 | 1.803 | 46.8 |
| 6 | 42c | STANDARD | −6.483506 | 0.7311299 | | |
| 7 | 44 | EVENASPH | −1.190766 | 0.7931577 | 1.530 | 55.9 |
| 8 | 46 | EVENASPH | −3.255035 | 0.08913065 | | |
| 9 | 48 | STANDARD | 11.64557 | 1.406402 | 1.836 | 42.3 |
| 10 | 50 | STANDARD | −11.64557 | 1.170561 | | |
| 11 | IMA | STANDARD | Infinity | | | |

Table 5: Aspheric coefficients for surface 44 and 46 in Table 4 for the configuration using the singlet plus cemented lens group of FIG. 2c;

TABLE 5

SURFACE DATA DETAIL Aspheric coefficients for surface 44 and 46 in Table 4.

| SURFACE Row Number | 44 Coefficient From Equation 1 | EVENASPH Surface 44 of the middle lens element 36, an EVENASPH Lens Surface |
|---|---|---|
| 1 | C | 0 |
| 2 | D | 0.0059721186 |
| 3 | E | 0.048396768 |
| 4 | F | −0.02009245 |
| 5 | G | 0 |
| 6 | H | 0 |
| 7 | I | 0 |

| SURFACE Row Number | 46 Coefficient From Equation 1 | EVENASPH Surface 46 of the middle lens element 36, an EVENASPH Lens Surface |
|---|---|---|
| 1 | C | 0 |
| 2 | D | 0.013788566 |
| 3 | E | −0.0021099459 |
| 4 | F | −0.00036758737 |
| 5 | G | 0 |
| 6 | H | 0 |
| 7 | I | 0. |

16. An imaging lens assembly consisting of:

an electronic imager having an active imaging area and an objective lens having an object surface for receiving light from an object and for forming an image on the image plane, the objective lens having, a lens group with positive power comprising two or three lens elements, the lens group having an object surface facing the object and an image surface, a middle lens element having an object surface and an image surface, the object surface being a concave surface facing the lens group image surface, the image surface being convex surface, and a final lens element having an object surface and an image surface and a positive power, the object surface facing the middle lens element image surface, the lens group, middle lens and final lens elements being coaxially aligned and positioned on an optical axis normal to the image plane, the lens elements being shaped and positioned such that TT/DI<1.5; wherein TT designates the distance from the vertex of the object surface of the first lens group to the image plane, and DI designates the maximum effective dimension of the imager active area.

* * * * *